United States Patent
Arndt et al.

(10) Patent No.: US 7,266,631 B2
(45) Date of Patent: Sep. 4, 2007

(54) ISOLATION OF INPUT/OUTPUT ADAPTER TRAFFIC CLASS/VIRTUAL CHANNEL AND INPUT/OUTPUT ORDERING DOMAINS

(75) Inventors: Richard Louis Arndt, Austin, TX (US); Patrick Allen Buckland, Austin, TX (US); Gregory Michael Nordstrom, Pine Island, MN (US); Steven Mark Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 264 days.

(21) Appl. No.: 10/902,611

(22) Filed: Jul. 29, 2004

(65) Prior Publication Data

US 2006/0026327 A1    Feb. 2, 2006

(51) Int. Cl.
  *G06F 13/20* (2006.01)
  *G06F 13/36* (2006.01)
  *G06F 13/40* (2006.01)
  *G06F 13/10* (2006.01)

(52) U.S. Cl. ..................... 710/309; 710/311

(58) Field of Classification Search ............ None
  See application file for complete search history.

(56) References Cited

U.S. PATENT DOCUMENTS

| 6,523,140 | B1 | 2/2003 | Arndt et al. ............... 714/44 |
| 6,643,727 | B1 | 11/2003 | Arndt et al. ............. 710/314 |
| 6,941,407 | B2* | 9/2005 | Shah et al. ............... 710/310 |
| 7,028,130 | B2* | 4/2006 | Lueck et al. ............. 710/306 |
| 2003/0115380 | A1* | 6/2003 | Ajanovic et al. ........... 710/1 |
| 2004/0019726 | A1* | 1/2004 | Kelley et al. ............. 710/305 |

* cited by examiner

*Primary Examiner*—Paul R. Myers
*Assistant Examiner*—Ryan Stiglic
(74) *Attorney, Agent, or Firm*—Duke W. Yee; Diana R. Gerhardt; Gerald H. Glanzman

(57) ABSTRACT

Method, apparatus and system for controlling input/output adapter data flow operations in a data processing system that includes at least one of a traffic class mechanism in conjunction with virtual channel resources so as to be able to associate Load/Store and DMA flows to/from an input/output adapter, and a relaxed ordering mechanism for associating a relaxed ordering bit to Load/Store operations to an input/output adapter. Functionality for controlling the input/output adapter data flow is provided in a host bridge that connects the input/output adapter to a system bus of the data processing system.

10 Claims, 4 Drawing Sheets

ISOLATION OF INPUT/OUTPUT ADAPTER TRAFFIC CLASS/VIRTUAL CHANNEL AND INPUT/OUTPUT ORDERING DOMAINS

BACKGROUND OF THE INVENTION

1. Technical Field

The present invention relates generally to the data processing field and, more particularly, to a method, apparatus and system for controlling input/output adapter data flow operations in a data processing system.

2. Description of Related Art

In a data processing system, it is important to ensure that operations involving the flow of data to and from an input/output adapter (IOA) are kept ordered relative to one another in order to assure a consistent programming model between the IOA and the device driver software which is controlling the IOA. This is conventionally accomplished by following strict ordering rules with respect to the data flows. It is also important to keep operations involving the flow of data to and from one IOA separate from flows to and from other IOAs so as to eliminate performance bottlenecks due to interactions of the flows between different IOAs.

In a data processing system using PCI(Peripheral Component Interconnect)-Express, it is known that interactions between data flows can be controlled by providing the data processing system with a traffic class (TC) mechanism in conjunction with virtual channel (VC) resources provided by PCI-Express. VCs comprise a separate set of resources through which IOA data flow operations can be routed, and TCs provide a mechanism for defining a priority between data flow operations being routed through a VC. By using the TC mechanism in conjunction with VCs, IOA data flow operations, for example, DMA (Direct Memory Access) and MMIO (Memory Mapped Input/Output) operations, can be differentiated from one another to help eliminate bottlenecks and to generally improve overall system performance. In addition, the PCI-Express specifications describe a relaxed ordering (RO) bit in the transaction flow, which can be used to relax the ordering between operations within the same TC and VC.

The specifications for PCI-Express describe how different TCs/VCs and the RO bit are handled below a PCI Host Bridge (PHB), hut do not describe how TCs/VCs are associated with IOAs or how the RO bit is controlled for Load/Store operations. In general, there are not enough TCs/VCs to be able to provide every IOA unit with its own TC/VC. Accordingly, a mechanism is needed to associate a TC/VC with an IOA unit. In particular, such a mechanism is needed in order to associate Load/Store operations from the data processing system above the PHB to Direct Memory Access (DMA) operations from below the PHB because ordering rules between the two flows need to be obeyed when the two flows are combined, and are modified based on whether or not the flows are in the same TC/VC. In order to be able to separate flows for IOA units that are to be treated separately, for example, different IOAs or different functions of IOAs, a mechanism is needed to associate the Load/Store and DMA flows to/from an IOA unit. Similarly, a mechanism is needed to associate the RO bit state with a Load/Store operation to control the ordering between operations in the same TC/VC.

It would, accordingly, be advantageous to provide a mechanism for controlling input/output adapter data flow operations in a data processing system that includes a TC mechanism in conjunction with VC resources so as to be able to associate Load/Store and DMA flows to/from an input/output adapter. It would also, accordingly, be advantageous to provide a mechanism for controlling input/output adapter data flow operations in a data processing system that includes an RO bit in the transaction, so as to be able to relax the ordering between operations to/from an IOA.

SUMMARY OF THE INVENTION

The present invention provides a method, apparatus and system for controlling input/output adapter data flow operations in a data processing system that includes at least one of a traffic class mechanism in conjunction with virtual channel resources so as to be able to associate Load/Store and DMA flows to/from an input/output adapter, and a relaxed ordering mechanism for associating an RO bit to Load/Store operations to an input/output adapter. Functionality for controlling the input/output adapter data flow is provided in a host bridge that connects the input/output adapter to a system bus of the data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
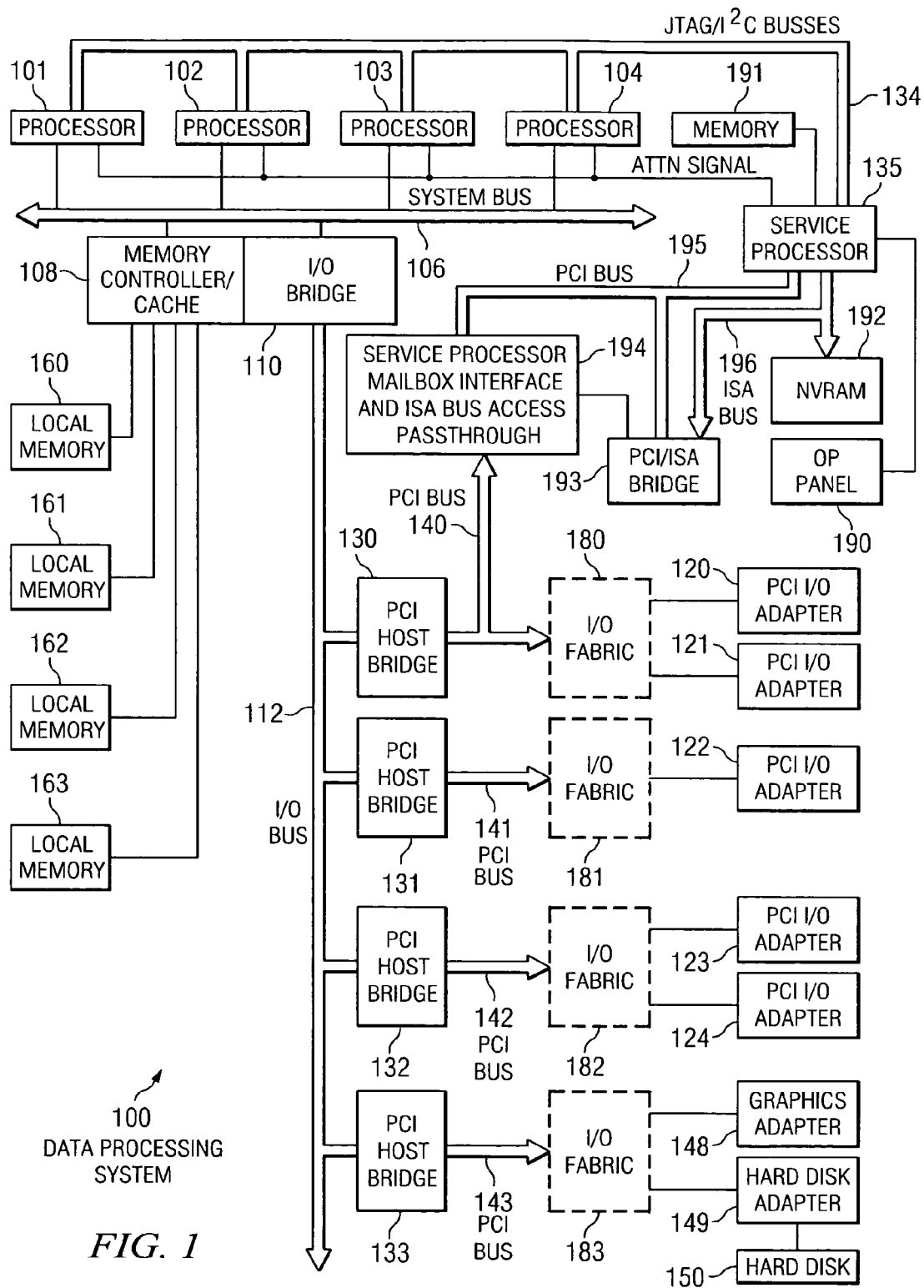
FIG. 1 is a block diagram of a data processing system in which the present invention may be implemented.

With reference now to the figures, FIG. 1, depicts a block diagram of a data processing system in which the present invention may be implemented. Data processing system 100 may be a symmetric multiprocessor (SMP) system including a plurality of processors 101, 102, 103, and 104 connected to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 is connected to system bus 106 and provides an interface to I/O bus 112. Memory controller/cache 108 and I/O bus bridge 110 may be integrated as depicted.

Data processing system 100 is a logical partitioned (LPAR) data processing system, however, it should be understood that the invention is not limited to an LPAR system but can also be implemented in other data processing systems. LPAR data processing system 100 has multiple heterogeneous operating systems (or multiple copies of a single operating system) running simultaneously. Each of these multiple operating systems may have any number of software programs executing within it. Data processing system 100 is logically partitioned such that different PCI input/output adapters (IOAs) 120, 121, 122, 123 and 124, graphics adapter 148 and hard disk adapter 149, or parts thereof, may be assigned to different logical partitions. In this case, graphics adapter 148 provides a connection for a display device (not shown), while hard disk adapter 149 provides a connection to control hard disk 150.

Thus, for example, suppose data processing system 100 is divided into three logical partitions, P1, P2, and P3. Each of PCI IOAs 120-124, graphics adapter 148, hard disk adapter 149, each of host processors 101-104, and memory from local memories 160-163 is assigned to each of the three partitions. In this example, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and PCI IOAs 121, 123 and 124 may be assigned to logical partition P1; processors 102-103, some portion of memory from local memories 160-163, and PCI IOAs 120 and 122 may be assigned to partition P2; and processor 104, some portion of memory from local memories 160-163, graphics adapter 148 and hard disk adapter 149 may be assigned to logical partition P3.

Each operating system executing within a logically partitioned data processing system 100 is assigned to a different logical partition. Thus, each operating system executing within data processing system 100 may access only those IOAs that are within its logical partition. For example, one instance of the Advanced Interactive Executive (AIX) operating system may be executing within partition P1, a second instance (copy) of the AIX operating system may be executing within partition P2, and a Linux or OS/400 operating system may be operating within logical partition P3.

Peripheral component interconnect (PCI) host bridges (PHBs) 130, 131, 132 and 133 are connected to I/O bus 112 and provide interfaces to PCI local busses 140, 141, 142 and 143, respectively. PCI IOAs 120-121 are connected to PCI local bus 140 through I/O fabric 180, which comprises switches and bridges. In a similar manner, PCI IOA 122 is connected to PCI local bus 141 through I/O fabric 181, PCI IOAs 123 and 124 are connected to PCI local bus 142 through I/O fabric 182, and graphics adapter 148 and hard disk adapter 149 are connected to PCI local bus 143 through I/O fabric 183. The I/O fabrics 180-183 provide interfaces to PCI busses 140-143 and will be described in greater detail hereinafter. A typical PCI host bridge will support between four and eight IOAs (for example, expansion slots for add-in connectors). Each PCI IOA 120-124 provides an interface between data processing system 100 and input/output devices such as, for example, other network computers, which are clients to data processing system 100.

PCI host bridge 130 provides an interface for PCI bus 140 to connect to I/O bus 112. This PCI bus also connects PCI host bridge 130 to service processor mailbox interface and ISA bus access pass-through logic 194 and I/O fabric 180. Service processor mailbox interface and ISA bus access pass-through logic 194 forwards PCI accesses destined to the PCI/ISA bridge 193. NVRAM storage 192 is connected to the ISA bus 196. Service processor 135 is coupled to service processor mailbox interface and ISA bus access pass-through logic 194 through its local PCI bus 195. Service processor 135 is also connected to processors 101-104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware OP-panel 190.

When data processing system 100 is initially powered up, service processor 135 uses the JTAG/I$^2$C busses 134 to interrogate the system (host) processors 101-104, memory controller/cache 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using an IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
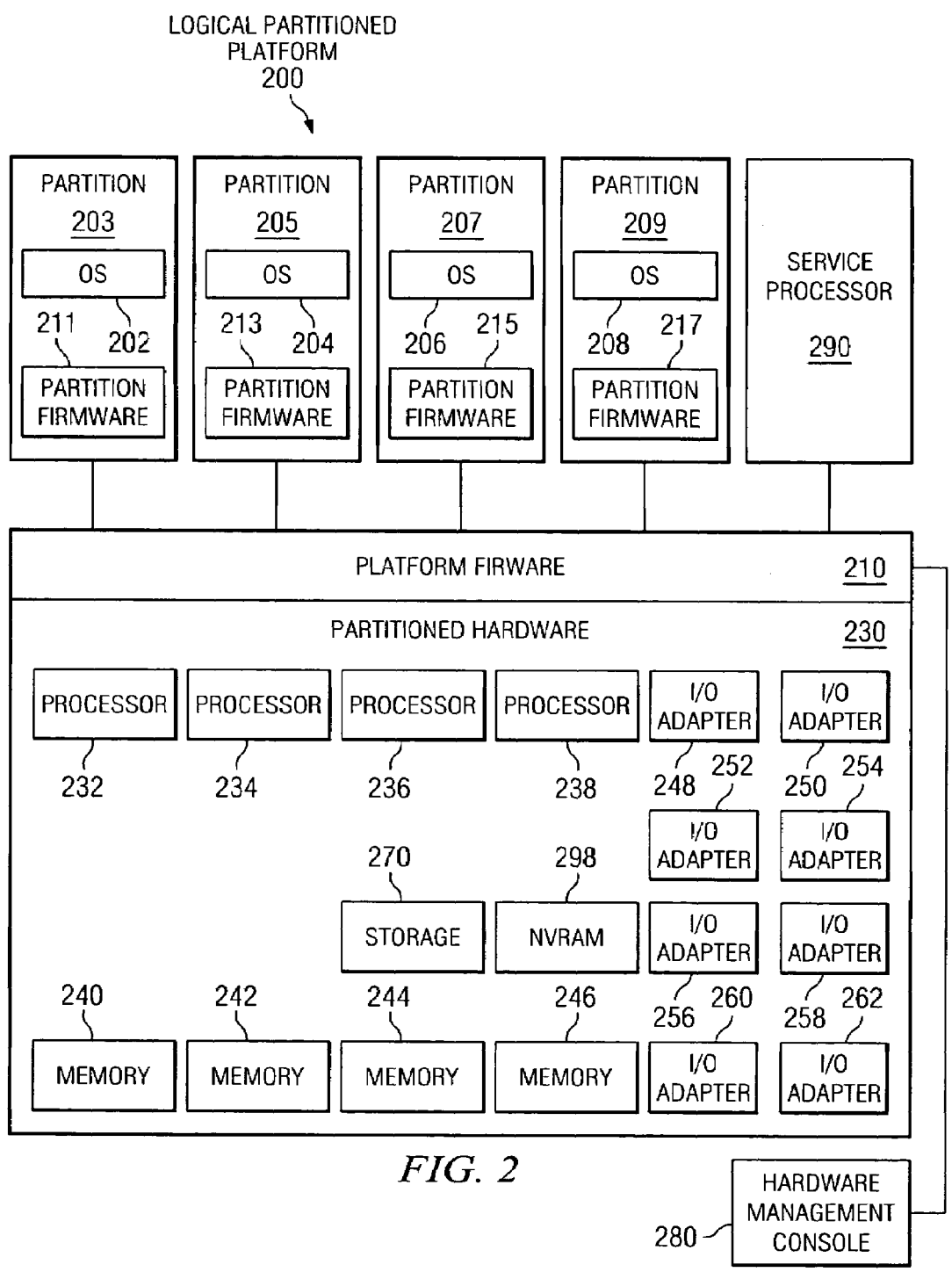
FIG. 2 is a block diagram of an exemplary logical partitioned platform in which the present invention may be implemented.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Other types of operating systems, such as AIX and Linux, may also be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of IOAs 248-262, and a storage unit 270. Each of the processors 232-238, memory units 240-246, NVRAM storage 298, and IOAs 248-262, or parts thereof, may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

In a data processing system, it is important to ensure that operations involving the flow of data to and from IOAs are kept ordered relative to one another in order to assure a consistent programming model between the IOA and the device driver software which is controlling the IOA. This is conventionally accomplished by following strict ordering rules with respect to the data flows. It is also important to keep operations involving the flow of data to and from one IOA separate from flows to and from other IOAs in order to eliminate performance bottlenecks due to interactions of the flows between different IOAs. It is also known that in a data processing system using PCI (Peripheral Component Interconnect)-Express, interactions between data flows can be controlled by providing the data processing system with a traffic class (TC) mechanism in conjunction with virtual channel (VC) resources provided by PCI-Express. Because there are generally not enough TCs/VCs to be able to provide every IOA with its own TC/VC, a mechanism is needed to associate Load/Store operations from the data processing system above the PHB to Direct Memory Access (DMA) operations from below the PHB because ordering rules need to be obeyed when the two flows are combined, and are modified based on whether or not the flows are in the same TC/VC. It is also known that in a data processing system using PCI-Express, a relaxed ordering (RO) bit in the transaction flow can be used to relax the ordering between operations within the same TC and VC.

In accordance with preferred embodiments of the present invention, functionality for controlling input/output adapter data flow operations in a data processing system that includes a traffic class mechanism in conjunction with virtual channel resources is provided in the PHB that connects the IOAs to the system bus of the data processing system. Also in accordance with preferred embodiments of the present invention, functionality for controlling input/output adapter data flow operations that include a relaxed ordering mechanism is provided in the PHB that connects the IOAs to the system bus of the data processing system.

Figure 3:
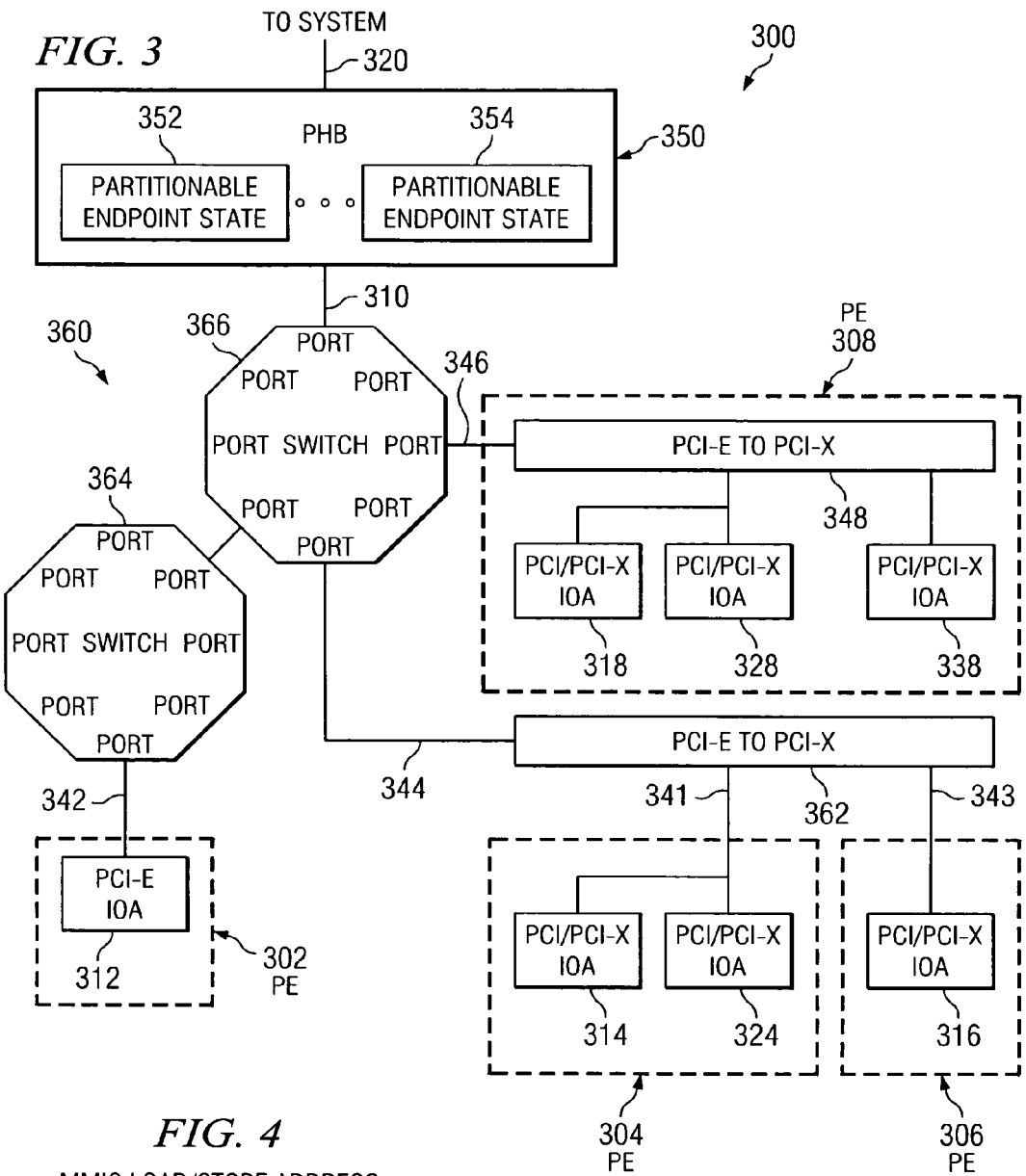
FIG. 3 is a block diagram that illustrates a system for controlling input/output unit data flow operations in a data processing system that includes a traffic class mechanism in conjunction with virtual channel resources in accordance with a preferred embodiment of the present invention.

FIG. 3 is a block diagram that illustrates a system for controlling input/output unit data flow operations in a data processing system that includes a traffic class mechanism in conjunction with virtual channel resources and/or a relaxed ordering mechanism in accordance with a preferred embodiment of the present invention. The system is generally designated by reference number 300, and comprises a plurality of Partitionable Endpoints (PEs) 302, 304, 306 and 308.

PEs 302, 304, 306 and 308 are capable of being treated separately, for example, are capable of being isolated from one another so that they can be separately assigned to different partitions of an LPAR data processing system. A PE, as used herein, is defined as being any part of an I/O subsystem that can be assigned independent of any other part of the I/O subsystem.

As will become apparent hereinafter, a PE as defined herein may be something more or something less than a single IOA. For example, a PE may comprise a plurality of IOAs that function together and, thus, that should be assigned as a unit, for example, to a single partition. A PE can also comprise a portion of a single IOA that has two ports that function as separate configuration chips. If the two ports provide separate functions, they are capable of being separately assigned to different partitions; and, thus, each port defines a separate PE. In general, a PE is defined by its function rather than by its structure.

The present invention utilizes the concept of a PE in conjunction with a mechanism located in a host bridge that connects PEs to a system bus of the data processing system for controlling input/output adapter data flow operations in a data processing system that includes a TC mechanism in conjunction with VC resources and/or an RO mechanism so as to be able to associate Load/Store and DMA flows to/from a PE.

As shown in FIG. 3, PEs 302, 304, 306 and 308 are each connected to PHB 350 by an I/O fabric that is generally designated by reference number 360.

I/O fabric 360 includes PCI bridge 362 and switches 364 and 366, and is connected to PHB 350 by local PCI bus 310 that connects switch 366 to PHB 350, and to PEs 302, 304, 306 and 308 by various secondary busses. As shown in FIG. 3, PCI busses 310, 342, 344, and 346 are PCI-Express (PCI-E) links. In particular, as shown in FIG. 3, PE 302 is connected to PHB 350 by secondary bus 342, switches 364 and 366 and local bus 310. PE 304 is connected to PHB 350 by secondary bus 341, PCI bridge 362, secondary bus 344, switch 366, and local bus 310. PE 306 is connected to PHB 350 by secondary bus 343, PCI bridge 362, secondary bus 344, switch 366, and local bus 310. PE 308 is connected to PHB 350 by local bus 346, switch 366 and local bus 310.

It should be understood that the specific configuration of I/O fabric 360 illustrated in FIG. 3 is intended to be exemplary only. The I/O fabric can be assembled in any appropriate manner using any suitable arrangement of busses, bridges and switches. Also, it should be understood that one of PEs 302, 304, 306 and 308 can be connected directly to PHB 350 rather than being connected to PHB 350 through I/O fabric 360 as shown in FIG. 3.

PE 302 and PE 306 each comprises a single IOA 312 and 316, respectively, such that IOAs 312 and 316 can each be assigned to a different partition of the data processing system. PE 304 comprises two IOAs 314 and 324 that function together and, thus, must be assigned to the same partition. PE 308 comprises three IOAs 318, 328 and 338 and bridge 348 that function together and must be assigned to the same partition.

In system 300, the endpoint states of each PE, referred to herein as Partitionable Endpoint States, are located in PHB 350 (two Partitonable Endpoint States 352 and 354 are schematically illustrated in FIG. 3). As a result, in system 300 I/O fabric 360 can be assembled using inexpensive, industry standard switch and bridge chips, thus permitting a reduction in the overall cost of the data processing system.

Among the functionalities provided in PHB 350 in FIG. 3 includes a functionality for controlling PE data flow operations, such as DMA (Direct Memory Access) and MMIO (Memory Mapped Input/Output) operations, in a data processing system that includes a traffic class (TC) mechanism in conjunction with virtual channel (VC) resources and/or a relaxed ordering (RO) mechanism so as to be able to associate Load/Store and DMA flows to/from each PE connected to the PHB.

VCs comprise a separate set of resources through which PE data flow operations can be routed, and TCs provide a mechanism for defining a priority between data flow operations being routed through a VC. TCs are defined by a 3-bit field that allows differentiation of data flow operations into eight different traffic classes. The TC mechanism, together with virtual channel support provided by PCI-Express, permits differentiation of PE data flow operations in the data processing system.

In particular, in a data processing system utilizing PCI-Express, every PCI-Express Transaction Layer Packet uses TC information as invariant information that is carried end-to-end within the PCI-Express fabric. As the packet traverses the fabric, the information is used at every link and within each switch element to make decisions with regards to proper servicing of the traffic. A key aspect of this servicing is the routing of the packets based on their TC labels through corresponding VCs. In general, differentiation of data flows by TCs and VCs helps to eliminate bottlenecks and provide improved system performance.

Also, in a data processing system utilizing PCI-Express, every PCI-Express Transaction Layer Packet uses RO information as invariant information that is carried end-to-end within the PCI-Express fabric. As the packet traverses the fabric, the information is used at every link and within each switch element to make decisions with regards to proper servicing of the traffic. A key aspect of this servicing is the routing of the packets based on their RO bit, in addition to TCs and VCs. In general, differentiation of data flows by RO bits also helps to eliminate bottlenecks and provide improved system performance.

In accordance with a preferred embodiment of the present invention, functionality for controlling PE data flow operations in a data processing system that includes a TC mechanism in conjunction with VC support and/or an R/O mechanism is enabled in the PHB by associating each PE or portion of a PE under a PHB with a different TC and/or by specifying the RO bit. This is done by associating a PE or part of a PE with a particular TC Number and/or RO bit. Each PE or portion of a PE associated with a TC may get assigned to a different VC, within the limit of the number of TCs and VCs implemented in the data processing system, and the number of PEs that exist below a PHB.

Associating a PE with a TC Number and/or RO bit value is permitted because there are no rules regarding the ordering of data flow operations between different TCs within a VC. There are also no requirements for ordering between DMA and MMIO flows and different PEs. Ordering is only important when data flow operations are to/from the same PE. In addition, there may be some aspects within some PEs that are not required to be ordered with other parts of the PE, and hence, a mechanism is provided to allow assignment of a portion of a PE a different TC Number or RO bit value than another portion of the PE.

Assignment of a PE or portion of a PE to a TC and/or RO bit is accomplished through a simple lookup process. In particular, in an MMIO operation, certain bits of an MMIO Load/Store address are used to look up the TC Number and/or RO bit associated with a PE or portion of a PE in a table in the PHB. This can be accomplished by having the TC Number and/or RO bit of the PE or portion of the PE as entries in the table.

Figure 4:
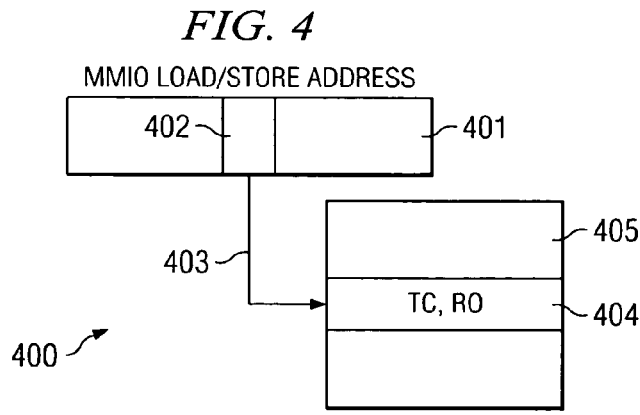
FIG. 4 is a conceptual flow diagram that illustrates an operation for controlling input/output unit data flow operations in a data processing system that includes a traffic class mechanism in conjunction with virtual channel resources and/or a relaxed ordering bit in accordance with a preferred embodiment of the present invention.

FIG. 4 is a conceptual flow diagram that illustrates an operation for controlling input/output unit data flow operations in a data processing system that includes a traffic class mechanism in conjunction with virtual channel resources and/or an RO bit in accordance with a preferred embodiment of the present invention. The operation is generally designated by reference number 400, and is illustrated in conjunction with an MMIO Load/Store operation. For MMIO Load/Store operations, certain bits 402 of an MMIO Load/Store Address 401 are used to lookup the Traffic Class (TC) number and/or the Relaxed Ordering (RO) bit 404 in MDT (MMIO Domain Table) 405 in the PHB as shown at 403. Bits 402 are referred to as an MDE (MMIO Domain Entry) Index, and are used to associate an MMIO address range with a TC number, and hence with a PE number, and/or to define whether or not the range should set the RO bit in the PCI operation.

The TC Number and/or the RO bit are then used to determine the proper ordering between different MMIO operations and between a DMA Write and an MMIO Load Reply.

Figure 5:
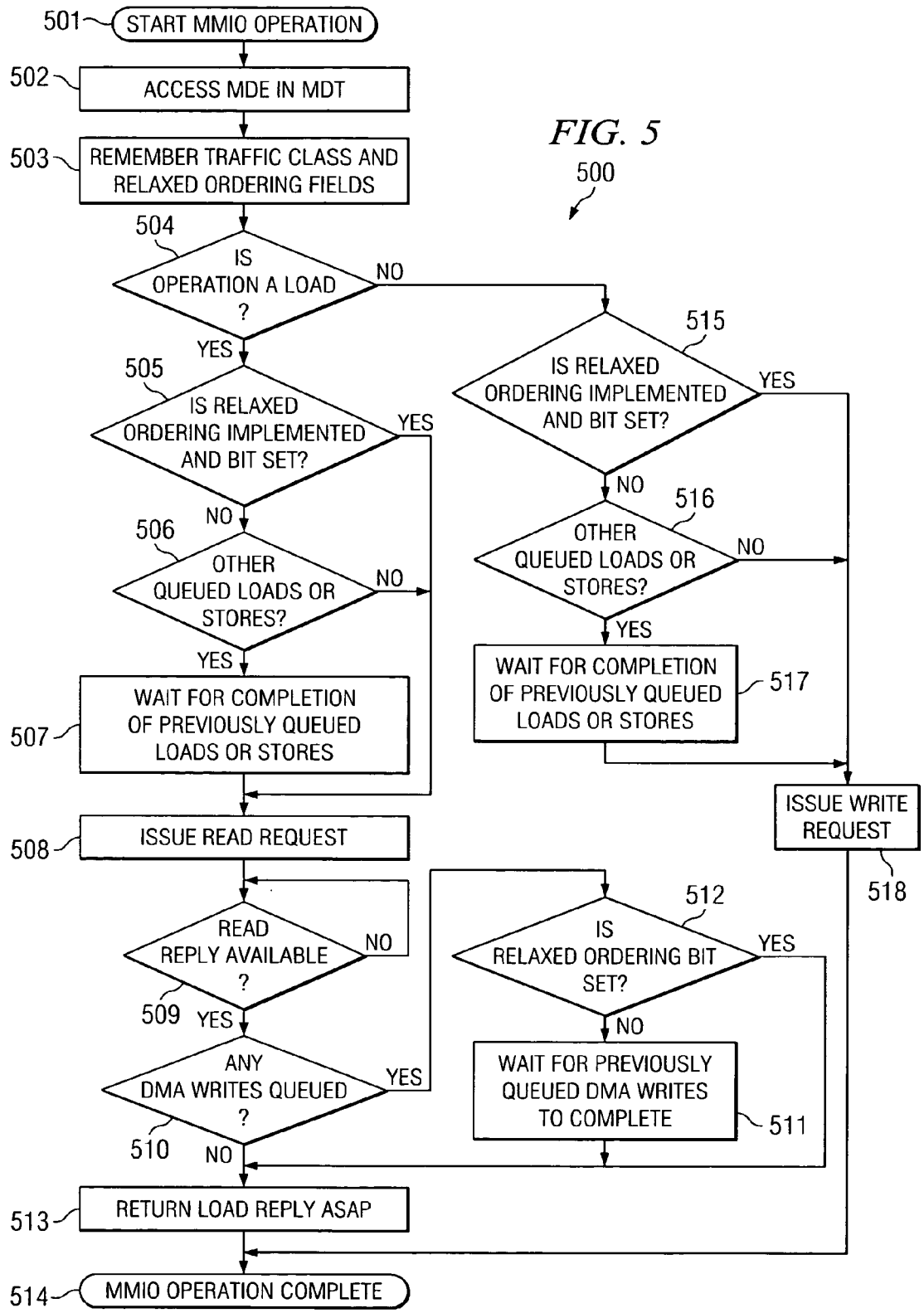
FIG. 5 is a flowchart that illustrates a method for controlling input/output unit data flow operations in a data processing system that includes a traffic class mechanism in conjunction with virtual channel resources and/or a relaxed ordering bit in accordance with a preferred embodiment of the present invention.

FIG. 5 is a flowchart that illustrates a method for controlling input/output unit data flow operations in a data processing system that includes a traffic class mechanism in conjunction with virtual channel resources and/or a relaxed ordering bit in accordance with a preferred embodiment of the present invention. The method is generally designated by reference number 500, and begins with the start of an MMIO operation (step 501). In MMIO Load and Store operations, the MDE Index is used to lookup the MDE in the MDT (step 502). The MDE contains the Traffic Class (TC) Number and/or the Relaxed Ordering (RO) bit for a PE requesting the MMIO operation. The TC Number and/or the RO bit are then remembered from the MDE for the duration of the MMIO operation (step 503).

A determination is then made as to whether the operation is a Load operation or a Store operation (step 504). If a Load operation (Yes output of step 504), a determination is made if the RO bit is implemented and set (step 505). If not implemented or not set (No output from step 505), it is determined if there are other queued Loads or Stores to the same TC number (step 506). If Yes, the MMIO operation waits until the other Loads and Stores that are queued have totally finished before starting (step 507), at which time the current MMIO Load Read Request operation can be performed to the I/O fabric whenever possible (step 508) using the TC and/or RO bit settings previously remembered (step 503).

For a Load operation, if a determination is made at step 505 that the RO bit is implemented and set (Yes output of step 505) or that it is not implemented or not set but that there are no other queued Loads or Stores to the same TC Number (No output of step 506), then the current MMIO Load Read Request operation can be performed to the I/O fabric whenever possible (step 508) using the TC and/or RO settings previously remembered (step 503).

After the Read Request for the MMIO Load has been issued (step 508), it is determined if the Read Reply is available (step 509). If not available, the operation waits until the read reply is available (No output of step 509).

After the Read Reply is returned from the I/O fabric (Yes output of step 509), a determination is made as to whether there are any queued DMA writes with the same TC Number (step 510). If there are none (No output of step 510) the Load reply can be returned whenever possible (step 513) and the MMIO operation is complete (step 514). If a determination is made that there are DMA writes queued (Yes output of step 510), a determination is made whether the RO bit is set for the MMIO Load (step 512). If the RO bit is set (Yes output of step 512), the Load Reply can be returned whenever possible (step 513), and the MMIO operation is complete (step 514). If the RO bit is not set (No output of step 512), the MMIO operation waits until previously queued DMA write operations have totally finished (step 511), then the Load reply can be returned whenever possible (step 513) and the MMIO operation is complete (step 514).

If a determination is made that the MMIO operation is a Store operation (No output of step 504), and if a determination is made that the RO bit is implemented and set (Yes output of step 515), or that it is not implemented or not set (No output of step 515) but that there are other queued Loads or Stores to the same TC Number (No output of step 516), then the MMIO Store Write request can be performed whenever possible (step 518) using the TC and/or RO bit settings previously remembered (step 503). If there are other queued Loads or Stores (Yes output of step 516), the MMIO operation waits until the other Loads and Stores that are queued have completely finished (step 517), at which time the current MMIO Store Write Request operation can be performed to the I/O fabric whenever possible (step 518) using the TC and/or RO settings previously remembered (step 503). The MMIO operation is then complete (step 514).

The present invention thus provides a technique for controlling input/output adapter data flow operations in a data processing system that includes a traffic class mechanism in conjunction with virtual channel resources and/or an RO bit. Functionality for controlling the input/output adapter data flow operations is provided in a host bridge that connects input/output adapters to a system bus of the data processing system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system, comprising:
a system bus;
a host bridge connected to the system bus;
at least one input/output unit connected to the host bridge;
at least one of a traffic class mechanism in conjunction with virtual channel resources and a relaxed ordering mechanism for differentiating input/output unit data flow operations; and
functionality in the host bridge for controlling the input/output unit data flow operations using the at least one of the traffic class mechanism in conjunction with virtual channel resources and the relaxed ordering mechanism, wherein the host bridge includes a table having a plurality of entries, each of the plurality of entries associating an input/output unit with at least one of a traffic class identifier and a relaxed ordering bit value, and wherein the host bridge includes functionality for controlling input/output unit data flow operations using at least one of the traffic class identifier and the table and the relaxed ordering bit value and the table, wherein the input/output unit data flow operations comprise MMIO operations, and wherein a portion of bits of an MMIO Load/Store address are used as an index in a lookup mechanism using the table in the host bridge to at least one of associate the traffic class identifier with an input/output unit and specify a relaxed ordering bit value.

2. The system according to claim 1 wherein the at least one input/output unit comprises a plurality of input/output units, each of the plurality of input/output units being identified by an input/output unit identifier, and wherein each input/output unit identifier is at least one of associated with the traffic class identifier and specified by the relaxed ordering bit value.

3. The system according to claim 1, wherein the data processing system includes both a traffic class mechanism in conjunction with virtual channel resources, and a relaxed ordering mechanism, and wherein the functionality in the host bridge includes functionality for controlling the input/output unit data flow operations using both the traffic class mechanism in conjunction with virtual channel resources and the relaxed ordering mechanism.

4. The system according to claim 1, wherein an input/output unit comprises one of an input/output adapter, a plurality of input/output adapters that function together, and a portion of an input/output adapter that provides a separate function.

5. A method for controlling input/output unit data flow operations in a data processing system that includes at least one of a traffic class mechanism in conjunction with virtual channel resources and a relaxed ordering mechanism for differentiating input/output unit data flow operations, the method comprising:
providing functionality for controlling input/output unit data flow operations using at least one of the traffic class mechanism in conjunction with virtual channel resources and the relaxed ordering mechanism in a host bridge that connects at least one input/output unit to a system bus of the data processing system, wherein the host bridge includes a table having a plurality of entries, each of the plurality of entries associating an input/output unit with at least one of a traffic class identifier and a relaxed ordering bit value, and wherein providing functionality in the host bridge comprises providing functionality in the host bridge for controlling input/output unit data flow operations using at least one of the traffic class identifier and the table and the relaxed ordering bit value and the table, wherein the input/output unit data flow operations comprise MMIO operations, and wherein providing functionality in a host bridge includes using a portion of bits of an MMIO Load/Store address as an index in a lookup mechanism using the table in the host bridge to at least one of associate a traffic class identifier with an input/output unit and specify a relaxed ordering bit value.

6. The method according to claim 5, wherein the at least one input/output unit comprises a plurality of input/output units, each of the plurality of input/output units being identified by an input/output unit identifier, and wherein each input/output unit identifier is at least one of associated with a traffic class identifier and specified by the relaxed ordering bit value.

7. The method according to claim 5, wherein the data processing system includes both a traffic class mechanism in conjunction with virtual channel resources, and a relaxed ordering mechanism, and wherein providing functionality for controlling input/output unit data flow operations includes providing functionality for controlling input/output unit data flow operations using both the traffic class mechanism in conjunction with virtual channel resources and the relaxed ordering mechanism.

8. An apparatus for controlling input/output unit data flow operations in a data processing system that includes at least one of a traffic class mechanism in conjunction with virtual channel resources and a relaxed ordering mechanism for differentiating input/output unit data flow operations in the data processing system, the apparatus comprising:
a host bridge for connecting at least one input/output unit to a system bus, the host bridge including functionality for controlling input/output unit data flow operations of the data processing system using at least one of the traffic class mechanism in conjunction with virtual channel resources and the relaxed ordering mechanism, wherein the host bridge includes a table having a plurality of entries, each of the plurality of entries associating an input/output unit with at least one of a traffic class identifier and a relaxed ordering bit value, and wherein the host bridge includes functionality for controlling input/output unit data flow operations using at least one of the traffic class identifier and the table and the relaxed ordering bit value and the table, wherein the input/output unit data flow operations comprise MMIO operations, and wherein a portion of bits of an MMIO Load/Store address are used as an index in a lookup mechanism using the table in the host bridge to at least one of associate the traffic class identifier with an input/output unit and specify a relaxed ordering bit value.

9. The apparatus according to claim 8, wherein the data processing system includes both a traffic class mechanism in conjunction with virtual channel resources, and a relaxed ordering mechanism, and wherein the functionality in the host bridge includes functionality for controlling the input/output unit data flow operations using both the traffic class mechanism in conjunction with virtual channel resources and the relaxed ordering mechanism.

10. A computer program product, in a recordable-type computer readable medium, for controlling input/output unit data flow operations in a data processing system that includes at least one of a traffic class mechanism in conjunction with virtual channel resources and a relaxed ordering mechanism for differentiating input/output unit data flow operations, comprising:
instructions for providing functionality for controlling input/output unit data flow operations using at least one of the traffic class mechanism in conjunction with virtual channel resources and the relaxed ordering mechanism in a host bridge that connects at least one input/output unit to a system bus of the data processing system, wherein the host bridge includes a table having a plurality of entries, each of the plurality of entries associating an input/output unit with at least one of a traffic class identifier and a relaxed ordering bit value, and wherein the instructions for providing functionality in the host bridge comprises instructions for providing functionality in the host bridge for controlling input/output unit data flow operations using at least one of the traffic class identifier and the table and the relaxed ordering bit value and the table, wherein the input/ output unit data flow operations comprise MMIO operations, and wherein the instructions for providing functionality further comprises instructions for using a portion of bits of an MMIO Load/Store address as an index in a lookup mechanism using the table in the host bridge to at least one of associate a traffic class identifier with an input/output unit and specify a relaxed ordering bit value.

* * * * *